United States Patent
Becks

(10) Patent No.: US 10,829,238 B2
(45) Date of Patent: Nov. 10, 2020

(54) ARRANGEMENT FOR PASSING A LINE IN A LOAD-FREE MANNER THROUGH A PRESSURE FRAME OF A FUSELAGE OF AN AIRCRAFT OR SPACECRAFT

(71) Applicant: AIRBUS OPERATIONS GMBH, Hamburg (DE)

(72) Inventor: Ralf Becks, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 342 days.

(21) Appl. No.: 15/176,477

(22) Filed: Jun. 8, 2016

(65) Prior Publication Data

US 2016/0280390 A1 Sep. 29, 2016

Related U.S. Application Data

(63) Continuation of application No. 13/964,690, filed on Aug. 12, 2013, now abandoned, which is a
(Continued)

(30) Foreign Application Priority Data

Feb. 18, 2011 (DE) .................. 10 2011 004 385

(51) Int. Cl.
*B64C 1/10* (2006.01)
*B64D 37/00* (2006.01)
(Continued)

(52) U.S. Cl.
CPC ............ *B64D 39/06* (2013.01); *B64C 1/10* (2013.01); *B64D 37/005* (2013.01); *F16L 5/025* (2013.01)

(58) Field of Classification Search
CPC ........ B64D 39/06; B64D 37/005; B64C 1/10; F16L 5/025
See application file for complete search history.

(56) References Cited

U.S. PATENT DOCUMENTS 2,410,999 A * 11/1946 Henry .................. F16J 15/064
174/51
2,509,978 A 5/1950 Kazimierz
(Continued)

FOREIGN PATENT DOCUMENTS

DE 39 23 871 1/1991
DE 10 2010 032 247 2/2011
(Continued)

OTHER PUBLICATIONS

International Search Report and Written Opinion for Application No. PCT/EP2012/052630 dated Jun. 1, 2012.
(Continued)

*Primary Examiner* — Vishal A Patel
*Assistant Examiner* — Thomas L Neubauer
(74) *Attorney, Agent, or Firm* — Jenkins, Wilson, Taylor & Hunt, P.A.

(57) ABSTRACT

The present invention provides an arrangement for passing a line in a load-free manner through a pressure frame of a fuselage of an aircraft or spacecraft, including an opening penetrating the pressure frame, through which opening the line is passed, the line being mechanically decoupled from the pressure frame; and a flexible sealing device arranged outside the opening at least in portions, which sealing device is simultaneously operatively connected to the line and the pressure frame for the pressure-tight separation of a first side from a second side of the pressure frame. The present invention also provides a fuselage for an aircraft or spacecraft having an arrangement of this type and an aircraft or spacecraft having an arrangement of this type or having a fuselage of this type.

14 Claims, 3 Drawing Sheets

Related U.S. Application Data continuation of application No. PCT/EP2012/052630, filed on Feb. 15, 2012.

(60) Provisional application No. 61/444,448, filed on Feb. 18, 2011.

(51) Int. Cl.
*B64D 39/06* (2006.01)
*F16L 5/02* (2006.01)

(56) References Cited

U.S. PATENT DOCUMENTS

| | | | | |
|---|---|---|---|---|
| 2,535,288 | A * | 12/1950 | Honkanen | F16L 5/08 277/580 |
| 2,620,208 | A * | 12/1952 | Patch | F16J 15/52 277/504 |
| 5,826,919 | A * | 10/1998 | Bravo | F16L 5/025 285/139.2 |
| 7,533,850 | B2 * | 5/2009 | Carns | B64D 39/06 244/135 R |
| 7,828,298 | B2 * | 11/2010 | Cummings | A62C 2/06 277/502 |
| 9,523,177 | B2 * | 12/2016 | Snethun | E02D 5/72 |
| 2002/0113375 | A1 * | 8/2002 | Ruderman | F16J 15/52 277/389 |
| 2014/0008879 | A1 | 1/2014 | Becks | |

FOREIGN PATENT DOCUMENTS

| | | |
|---|---|---|
| EP | 0 387 400 | 9/1990 |
| EP | 0 847 916 | 6/1998 |
| EP | 2 675 703 B1 | 1/2017 |
| FR | 2 525 729 | 10/1983 |
| FR | 2 862 736 | 5/2005 |
| GB | 1 587 400 | 4/1981 |
| WO | WO 2012/110568 | 8/2013 |

OTHER PUBLICATIONS

German Office Action for Application No. 10 2011 004 385.3 dated Feb. 7, 2013.
Non-Final Office Action for U.S. Appl. No. 13/964,690, dated Jul. 1, 2015.
Final Office Action for U.S. Appl. No. 13/964,690, dated Feb. 12, 2016.
Advisory Action for U.S. Appl. No. 13/964,690, dated May 3, 2016.
Interview Summary for U.S. Appl. No. 13/964,690, dated Jun. 2, 2016.
European Office Action for Application No. 12703829.7 dated Feb. 11, 2016.

* cited by examiner

ARRANGEMENT FOR PASSING A LINE IN A LOAD-FREE MANNER THROUGH A PRESSURE FRAME OF A FUSELAGE OF AN AIRCRAFT OR SPACECRAFT

CROSS-REFERENCES TO RELATED APPLICATIONS

This application is a continuation of and claims priority to U.S. application Ser. No. 13/964,690 filed Aug. 12, 2013, which is a continuation of and claims priority to PCT/EP2012/052630 filed Feb. 15, 2012 which claims the benefit of and priority to U.S. Provisional Application No. 61/444,448, filed Feb. 18, 2011, and German patent application No. 10 2011 004 385.3, filed Feb. 18, 2011, the entire disclosures of which are herein incorporated by reference.

FIELD OF THE INVENTION

The present invention relates to an arrangement for passing a line in a load-free manner through a pressure frame of a fuselage of an aircraft or spacecraft, a fuselage for an aircraft or spacecraft having an arrangement of this type and an aircraft or spacecraft having an arrangement of this type or having a fuselage of this type.

Although applicable to any aircraft or spacecraft, the present invention will be described in greater detail by way of example with reference to an aircraft.

BACKGROUND OF THE INVENTION

During the flight phase of the aircraft, an internal pressure is usually applied to the passenger cabin thereof, which internal pressure is above the external atmospheric pressure. For this purpose, the passenger cabin must be constructed in a pressure-tight manner. This is achieved in particular by means of a pressure frame arranged in the tail region of the aircraft. The pressure frame separates, for example, the pressurized passenger cabin from an unpressurized or lightly pressurized fuselage portion.

EP 0 847 916 B1 accordingly discloses a pressure frame in the shape of a dome, in particular at the tail-end termination of the pressurized region of an aircraft fuselage, an annular frame being provided to receive annular forces in particular, the annular frame being formed by the edge of the dome, in such a way that the edge having a transition region having the internal radius of curvature is turned up at an acute angle in the direction of the fuselage tail in such a way that it fits tightly against the inside of the fuselage structure in a peripheral contact strip having a predetermined width.

DE 39 23 871 C2 also discloses a pressure frame made of fibre composite material for an aircraft having a pressure fuselage, the pressure frame comprising a dome shape which transitions at the edge into a shape corresponding to the aircraft. In the edge region the pressure frame is reinforced by the integration of further fibre layers, and rigid fibre material can preferably be used here.

In an aircraft having a pressure frame, it is necessary to pass lines, in particular fuel lines, from the pressurized region of the fuselage into the pressure-free region and vice versa, and in this case maintain the prevailing pressure difference between the fuselage regions. For example, a fuel line must be passed from a central wing box of the aircraft to an auxiliary energy unit, such as an auxiliary gas turbine, which is normally arranged in the tail region of the aircraft, or to tail-end trimming tanks of the aircraft. To do this, it is necessary to pass the fuel line through the pressure frame arranged at the tail end. It is operatively known to the applicant to pass the fuel line through the pressure frame by means of a suitable arrangement for passing the fuel line through. The pressure frame comprises an opening for this purpose, in which a sleeve is arranged which is sealed against the opening by means of an O-ring. The fuel line is passed through the sleeve and is sealed against the sleeve by means of a further O-ring. An axial displacement of the line and a rotation of the line relative to the pressure frame are therefore possible. It has however proved disadvantageous that, owing to the lack of mechanical decoupling of the line from the pressure frame in the case of deformations of the pressure frame or the surrounding fuselage structure, an unacceptably high mechanical loading of the fuel line is reached, as a result of which, for example, leakages in a line system of the aircraft can occur. This is obviously to be avoided.

SUMMARY OF THE INVENTION

It is therefore one idea of the present invention to provide an improved arrangement for passing a line in a load-free manner through a pressure frame of a fuselage of an aircraft or spacecraft, which arrangement eliminates the above-mentioned disadvantages.

An arrangement is accordingly provided for passing a line in a load-free manner through a pressure frame of a fuselage of an aircraft or spacecraft, comprising: an opening penetrating the pressure frame, through which opening the line is passed, the line being mechanically decoupled from the pressure frame; and a flexible sealing device arranged outside the opening, at least in portions, which device is simultaneously operatively connected to the line and the pressure frame for pressure-tight separation of a first side from a second side of the pressure frame.

A fuselage for an aircraft or spacecraft having an arrangement of this type and an aircraft or spacecraft having an arrangement of this type or having a fuselage of this type are also provided.

The idea on which the present invention is based consists in providing an arrangement which allows the line to be passed through the pressure frame in such a way that the line is mechanically decoupled from the pressure frame. It is hereby possible to reliably prevent mechanical loading of the line, even in the case of severe deformation and/or deformation of varying severity of the fuselage structure and/or of the pressure frame owing to flight loads and/or loads resulting from the pressurisation of the pressure frame. The occurrence of leakages in a line system of an aircraft or spacecraft can thus be prevented by an arrangement of this type, as a result of which the reliability of an aircraft of this type is increased.

According to a preferred embodiment, the sealing device is formed in one piece. This ensures a particularly simple, economical and easy-to-assemble construction of the arrangement.

According to a preferred embodiment, a predetermined air gap is arranged between an edge of the opening and the line in order to achieve free movability of the line in the opening. Axial and radial movability of the line in the opening is hereby advantageously ensured, as a result of which the line is mechanically decoupled from the pressure frame at all times.

According to a further preferred embodiment, the sealing device is constructed as a bellows. The sealing device can thus be deformed particularly easily and without transmitting forces to the line.

According to a further preferred embodiment, the sealing device is arranged on the first side of the pressure frame. There is preferably a higher pressure on the first side of the pressure frame than on the second side of the pressure frame. There is thus an overpressure on the outside of the sealing device at all times, as a result of which an excessive expansion of the sealing device and possible damage thereto as a result is reliably prevented.

According to a further preferred embodiment, the sealing device has approximately a truncated cone shape having a first end-face flange portion and a second end-face flange portion, the sealing device in particular tapering, starting from the second end-face flange portion, towards the first end-face flange portion. A cross-sectional difference from the opening towards the line can hereby advantageously be bridged without the use of additional construction elements.

According to a further preferred embodiment, the line comprises a first coupling device assigned to the first, in particular pressurized, side of the pressure frame, and a second coupling device assigned to the second, in particular unpressurized, side of the pressure frame. A modular construction of a line system of the aircraft or spacecraft is hereby advantageously ensured, as a result of which individual components of the line system can be conveniently replaced.

According to a further preferred embodiment, the first coupling device is fixed to a first structural element of the fuselage, which structural element is assigned to the first side of the pressure frame, and a second coupling device is fixed to the second structural element assigned to the second side of the pressure frame. A reliable positioning of the line relative to the pressure frame is hereby ensured. The line thus moves together with the load-bearing structural elements of the fuselage.

According to a further preferred embodiment, the sealing device is fixed to the first coupling device of the line, as a result of which the assembly effort required to assemble the sealing device is reduced.

According to a further preferred embodiment, the arrangement comprises a flange which surrounds the opening, extends out from the pressure frame and is in particular tubular. A simple and convenient assembly of the sealing device is hereby ensured, the device being operatively connected only to the projecting flange for assembly on the pressure frame.

According to a further preferred embodiment, the flange extends out from the pressure frame on the first side thereof, as a result of which the flange is advantageously only minimally deformed in the case of a bending deformation of the pressure frame.

According to a further preferred embodiment, the sealing device is fixed to an end portion of the flange. A simple assembly of the sealing device by sliding the sealing device onto the end portion is hereby ensured.

According to a further preferred embodiment, the line is formed as a fuel line, as a result of which the arrangement advantageously ensures a leakage-free fuel supply of an aircraft or spacecraft having an arrangement of this type.

BRIEF DESCRIPTION OF THE DRAWINGS

The invention is described in further detail in the following by way of embodiments with reference to the appended schematic figures of the drawings.

In the figures.

In the figures, like reference numerals denote like or functionally equivalent components, unless stated otherwise.

DETAILED DESCRIPTION OF THE INVENTION

Figure 1:
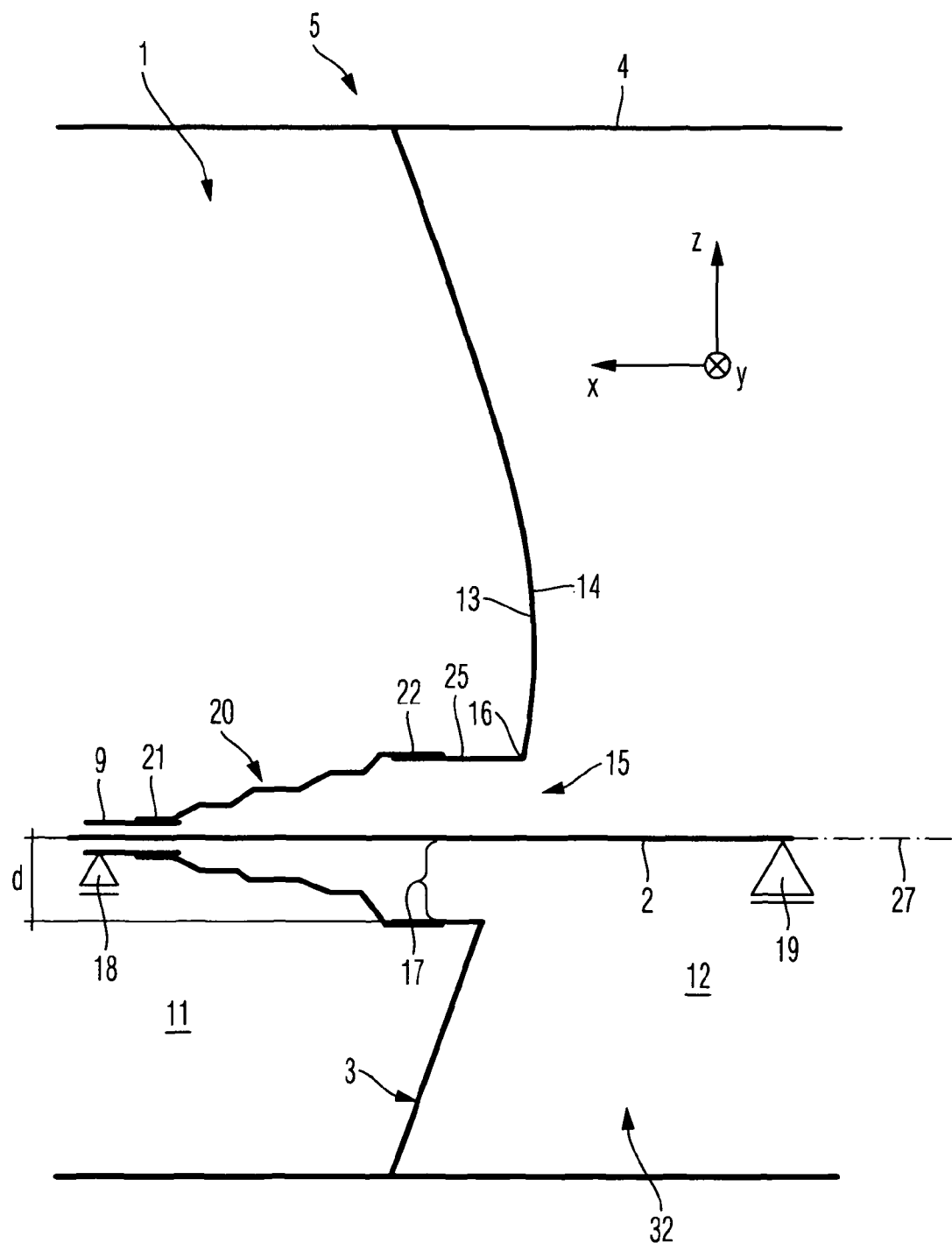
FIG. 1 is a sectional view of a preferred embodiment of an arrangement for passing a line in a load-free manner through a pressure frame of a fuselage of an aircraft or spacecraft.
Figure 2:
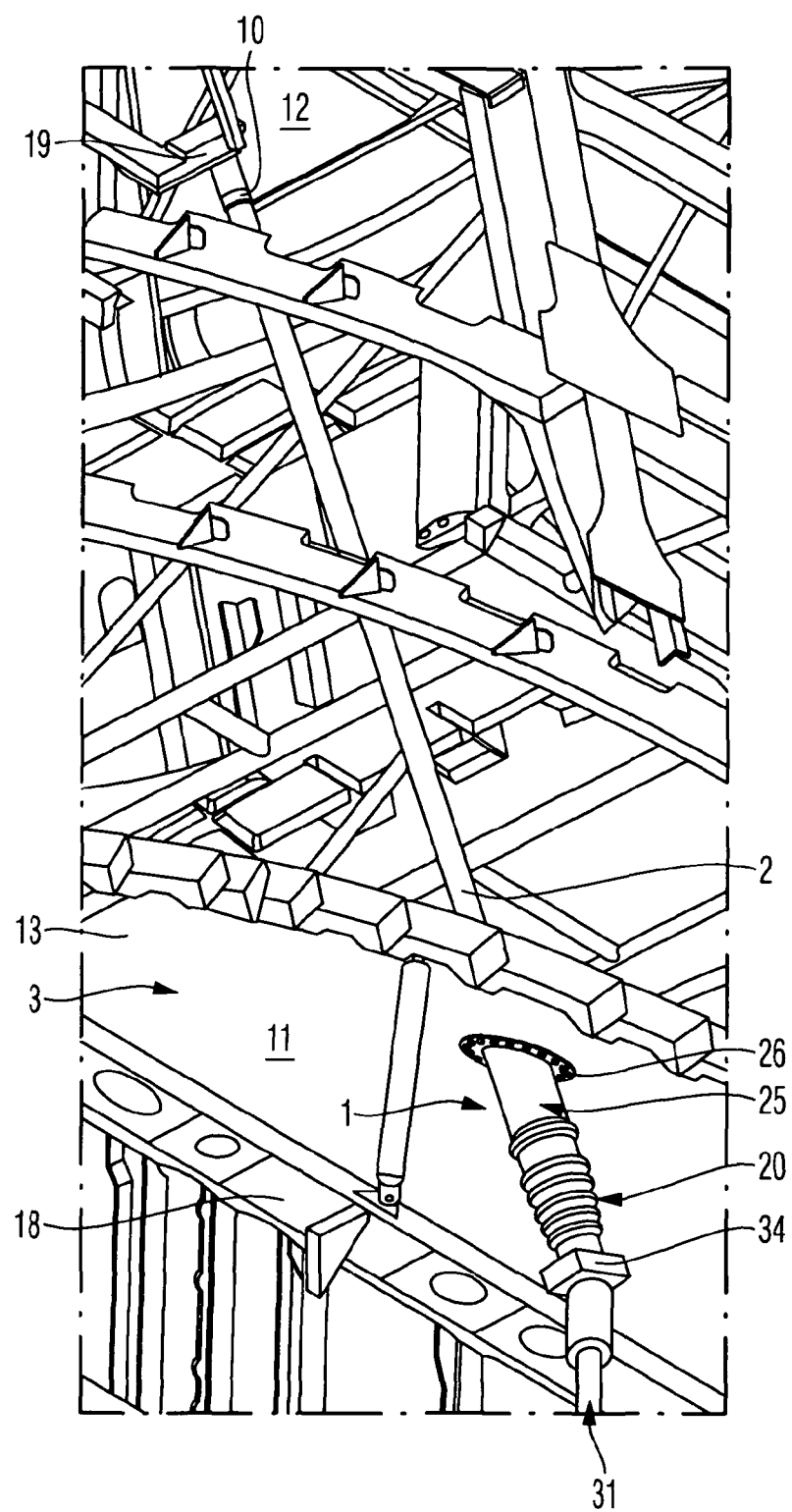
FIG. 2 is a perspective view of the arrangement according to FIG. 1.
Figure 3:
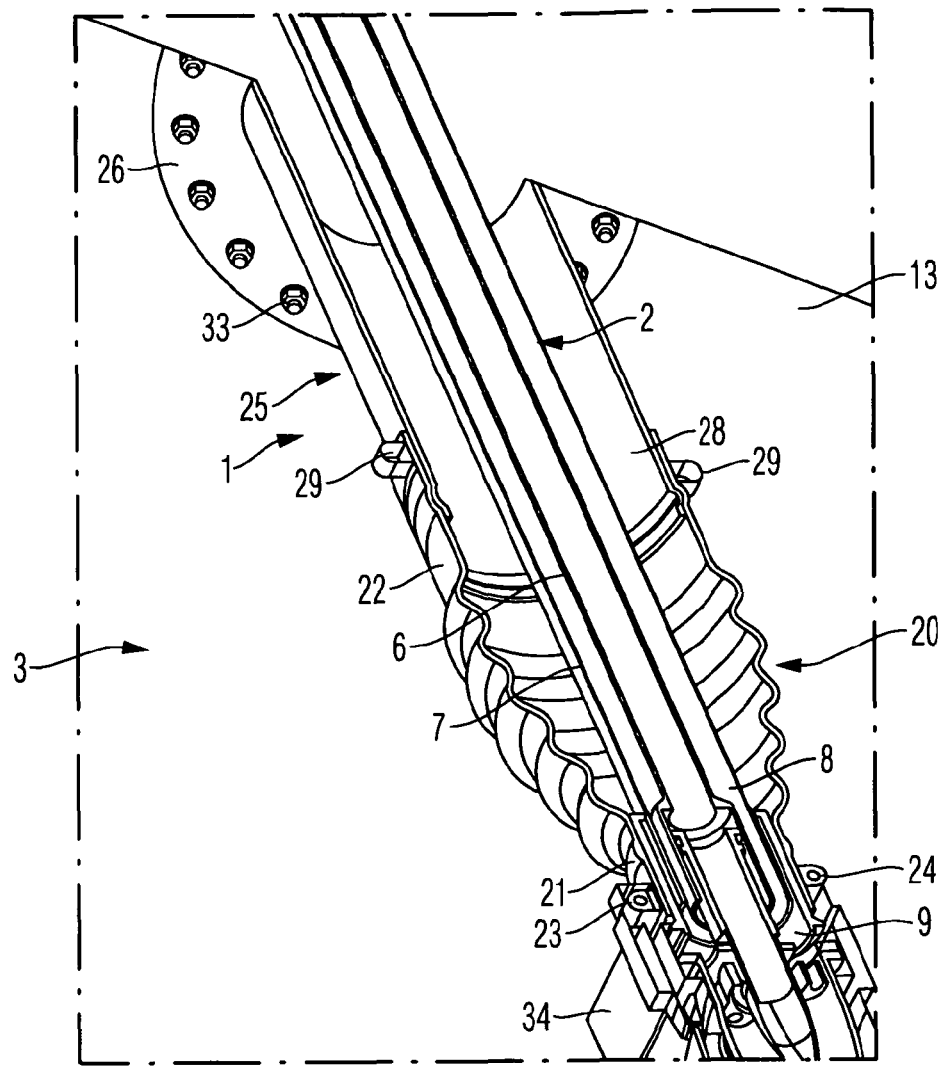
FIG. 3 is a further perspective view of the arrangement according to FIG. 1.

FIGS. 1 to 3, which are referred to simultaneously in the following, illustrate a preferred embodiment of an arrangement 1 for passing a line 2 in a load-free manner through a pressure frame 3 of a fuselage 4, in particular a fuselage airframe 4, of an aircraft or spacecraft 5. The fuselage 4 is preferably formed using a fibre-reinforced plastics material, in particular using a carbon-fibre-reinforced plastics material. The fuselage 4 can comprise a metal material. This material can be flexibly deformed by mechanical loads which act on the fuselage 4 during operation of the aircraft or spacecraft 5. A longitudinal direction of the fuselage 4 is denoted by x, a transverse direction by y and a vertical direction by z.

The line 2 is preferably formed as a fuel line 2 of the aircraft or spacecraft 5. The line 2 can also be formed as an electrical or mechanical supply line 2. The line 2 is in particular formed as a double-walled line 2 having an inner wall 6 and an outer wall 7 which concentrically surrounds the inner wall 6. The inner wall 6 preferably has a tubular cross-section through which fuel is conveyed. An intermediate space 8, in particular an intermediate space 8 filled with air, is provided between the inner wall 6 and the outer wall 7. The intermediate space 8 can be filled with a gas other than air, for example with an inert gas. The intermediate space 8 can also be drainable. The walls 6, 7 can be formed using a fibre-reinforced plastics material and/or a metal material. The line 2 preferably comprises a first end-face coupling device 9 and a second end-face coupling device 10. The line 2 is operatively connected to a line system 31 of the aircraft or spacecraft 5 in a detachable manner by means of the coupling devices 9, 10. The coupling devices 9, 10 are for example formed as detachable quick couplings 9, 10.

The pressure frame 3, also referred to as a pressure dome 3 or pressure bulkhead 3, preferably divides an interior 32 of the fuselage 4 in the x-direction into at least a first fuselage portion 11 and a second fuselage portion 12. The first fuselage portion 11 is for example formed as a passenger cabin 11 of the aircraft or spacecraft 5. The second fuselage portion 12 can be an unpressurized region 12 of the aircraft or spacecraft 5. A first side 13 of the pressure frame 3 preferably faces towards the first fuselage portion 11 and a second side 14 of the pressure frame 3 preferably faces towards the second fuselage portion 12. The pressure frame 3 is preferably curved convexly towards the second side 14. When viewed from the second fuselage portion 12, the pressure frame 3 is in particular curved convexly into said fuselage portion. The pressure frame 3 preferably has an approximately watch-glass shape. Air pressure, in particular artificially produced air pressure, is preferably applied to the first fuselage portion 11 and the first side 13 of the pressure dome. The second fuselage portion 12 and the second side 14 of the pressure frame 3 are preferably unpressurized, that is to say an artificially produced overpressure preferably does not prevail in the second fuselage portion 12. The second fuselage portion 12 is for example under atmospheric pressure. An air-pressure difference preferably prevails between the first side 13 and the second side 14 of the pressure frame 3. The pressure frame 3 is preferably peripherally operatively connected to the fuselage 4 or to load-bearing structures of the fuselage 4. For this purpose, the pressure frame 3 can comprise a peripheral annular frame which is connected to the fuselage 4. The pressure frame 3 can be formed integrally with the fuselage 4, in particular with a fuselage skin. For example, the pressure frame 3 is formed using a fibre-reinforced plastics material, in particular a carbon-fibre-reinforced plastics material. The pressure frame 3 can comprise a metal material, such as an aluminium material. The pressure frame 3 absorbs loads resulting from the pressurisation of the first fuselage portion 11 and flight loads occurring during operation of the aircraft or spacecraft 5. The pressure frame 3 can hereby be flexibly deformed.

The pressure frame 3 further comprises an opening 15 penetrating therethrough and comprising an edge 16, in particular a peripheral edge. The opening 15 is preferably circular. Alternatively, the opening 15 can for example be rectangular or elliptical. The opening 15 connects the fuselage portions 11, 12 to one another. The line 2 is passed through the opening 15. The line 2 is preferably mechanically decoupled from the pressure frame 3 in this case. In particular, the line 2 is passed through the opening 15 without contact therewith. In order to achieve free movability of the line 2 in the opening 15, a predetermined air gap 17 is arranged between the line 2 and the edge 16 of the opening 15. The line 2 can move in the opening 15, preferably in the x-, y- and/or z-direction. The air gap 17 preferably completely surrounds the line 2 and ensures at all times that the line 2 is mechanically decoupled from the pressure frame 3. A thickness d of the air gap 17, which is preferably measured starting from the outer wall 7 to the edge 16, is formed in such a way that the line 2 does not contact the edge 16 even in the case of severe deformations and/or deformations of varying severity of the fuselage 4 and/or the pressure bulkhead 3, as a result of which mechanical decoupling of the line 2 from the pressure frame 3 is ensured at all times.

The line 2 is preferably fixed to a structural element 18 of the fuselage 4 using the first coupling device 9, which is in particular assigned to the first side 13 of the pressure frame 3. A fixing element 34 which operatively connects the structural element 18 and the coupling device 9 can be provided for this purpose. The structural element 18 is for example a crossbar 18 of the fuselage 4. The second coupling device 10 of the line 2, which is preferably assigned to the second side 14 of the pressure frame 3, is preferably fixed to a further structural element 19. The further structural element 19 is for example a so-called A-bracket 19 of the fuselage 4. An A-bracket is a bracket connected to load-bearing elements of the fuselage 4. The line 2 is thus mounted on the two structural elements 18, 19 and passed through the pressure frame 3 by means of the opening 15. The line 2 is thus preferably decoupled from movements and/or deformations of the pressure frame 3. The line 2 can be mounted on the structural elements 18, 19 or on one of the structural elements 18, 19 in the form of a movable mounting, that is to say, for example, so as to be displaceable in the x-direction.

The arrangement 1 preferably comprises a sealing device 20, which is in particular flexible, is arranged outside the opening 15 at least in portions and is preferably simultaneously operatively connected to the line 2 and to the pressure frame 3 for the pressure-tight separation of the first side 13 from the second side 14 of the pressure frame 3. The sealing device 20 preferably separates the fuselage portions 11, 12 from one another in a pressure-tight manner. The sealing device 20 is in particular formed in one piece. The sealing device 20 is preferably formed using a rubber-elastic material, such as a rubber material and/or silicone material. The sealing device 20 can be fibre-reinforced and/or formed as fibrous tissue. For example, the sealing device 20 is formed as a bellows 20. The sealing device 20 is preferably arranged on the first side 13, that is to say on the pressurized side 13, of the pressure frame 3. The sealing device 20 preferably projects into the first fuselage portion 11. In particular, the sealing device 20 allows the line to move in the opening 15 in an x-, y-, and/or z-direction. In the case of a displacement of the line 2 in the x-direction relative to the pressure frame 3, the sealing device 20 can be displaced in the opening 15, at least in part. This allows the greatest possible axial displaceability of the line 2 in the x-direction relative to the pressure frame 3. The preferably flexible configuration of the sealing device 20 also ensures movability of the line 2 relative to the edge 16 of the opening 15 in the y- and z-directions at all times.

The sealing device 20 preferably has approximately a truncated cone shape comprising a first end-face flange portion 21 and a second end-face flange portion 22. The sealing device 20 preferably tapers starting from the second end-face flange portion 22 towards the first end-face flange portion 21. The sealing device 20 is preferably fixed to the first coupling device 9 of the line 2. In particular, the first end-face flange portion 21 of the sealing device 20 is fixed to the first coupling device 9 and/or the first structural element 18 by means of two clamps 23, 24, arranged with axial spacing from one another. The flange portion 21 preferably surrounds the line 2 and/or the coupling device 9 in such a way that a pressure-tight operative connection is produced therebetween. The second end-face flange portion 22 of the sealing device 20 is preferably operatively connected to the pressure frame 3.

The arrangement 1 comprises in particular a preferably tubular flange 25 which surrounds the opening 15 and extends out from the pressure frame 3. The flange 25 extends for example from the first side 13 of the pressure frame 3 towards the first fuselage portion 11 and has in particular a leading edge which is oriented approximately parallel to the z-direction. The flange 25 is preferably formed as an A-bracket 25. The flange 25 in particular comprises a contact portion 26 which preferably rests on the surface of the pressure frame 3 in a planar manner. The contact portion 26 can rest on the first side 13 of the pressure frame 3. The contact portion 26 is preferably connected to the pressure frame 3, for example by means of a rivet connection which comprises a large number of rivets 33. The contact portion 26 can alternatively or additionally be screwed, glued or connected in any way to the pressure frame 3. A seal can be provided between the contact portion 26 and the pressure frame 3. Alternatively, the contact portion 26 can be formed integrally with the pressure frame 3. A centre axis 27 of the flange 25 extends preferably approximately parallel to the x-direction. The sealing device 20 is preferably fixed to an end portion 28 of the flange 20. The second end-face flange portion 22 of the sealing device 20 is preferably mounted on the end portion 28 of the flange 25 by means of two clamps 29, 30. The flange portion 22 of the sealing device 20 can be glued to the end portion 28. The end portion 28 can have a peripheral protrusion on the outside, which protrusion is operatively engaged with the flange portion 22 in order to fix this flange portion in the x-direction. The flange portion 22 preferably surrounds the end portion 28 of the flange 25 in such a way that a pressure-tight connection is produced therebetween.

By means of the arrangement 1 it is possible to pass the line 2, which is fixed to corresponding structural elements 18, 19 of the fuselage 4 by means of the coupling devices 9, 10, in a load-free manner through the opening 15 of the pressure frame. In this case, the line 2 is mechanically decoupled from the pressure frame 3 at all times, as a result of which no unwanted loads are transferred to the line 2. Mechanical loading of the coupling devices 9, 10 is thus prevented, as a result of which the danger of a leak occurring in the line system 31 of the aircraft or spacecraft is avoided or at least reduced.

The materials, numerical data and dimensions given are to be understood as examples and merely serve to illustrate the embodiments and developments of the present invention.

It is obviously also possible to use the invention in other fields, in particular in vehicle construction or shipbuilding.

What is claimed is:

1. A fuselage for an aircraft or spacecraft comprising an arrangement for passing a line in a load-free manner through a pressure frame of the fuselage comprising:
    an opening penetrating the pressure frame, through which opening the line is passed, wherein the line is mechanically decoupled from the pressure frame;
    a flexible sealing device arranged outside the opening at least in portions, which sealing device is simultaneously operatively connected to the line and the pressure frame for the pressure-tight separation of a first side from a second side of the pressure frame;
    a first end-face coupling device assigned to the first, pressurized side of the pressure frame; and
    a second coupling device assigned to the second, unpressurized side of the pressure frame,
    wherein the line is operatively connected to a line system of the aircraft or spacecraft in a detachable manner by the first end-face coupling device and the second coupling device,
    wherein the first end-face coupling device is fixed to the sealing device and to a first structural element of the fuselage, wherein the first structural element is assigned to the first side of the pressure frame, and
    wherein the second coupling device is fixed to a second structural element of the fuselage assigned to the second side of the pressure frame such that the first end-face coupling device and the second coupling device are on opposite sides of the pressure frame.

2. The fuselage according to claim 1, wherein the sealing device is formed in one piece.

3. The fuselage according to claim 1, wherein a predetermined air gap is arranged between the line and an edge of the opening in order to achieve free movability of the line in the opening.

4. The fuselage according to claim 1, wherein the sealing device is formed as a bellows.

5. The fuselage according to claim 1, wherein the sealing device is arranged on the first side of the pressure frame.

6. The fuselage according to claim 1, wherein the sealing device has approximately a truncated cone shape having a first end-face flange portion and a second end-face flange portion, the sealing device tapering, starting from the second end-face flange portion, towards the first end-face flange portion.

7. The fuselage according to claim 1, wherein the sealing device is fixed to the first end-face coupling device using two clamps spaced axially from one another.

8. The fuselage according to claim 1, comprising a flange which surrounds the opening and extends out from the pressure frame.

9. The fuselage according to claim 8, wherein the flange is tubular.

10. The fuselage according to claim 8, wherein the flange extends out from the pressure frame on the first side thereof.

11. The fuselage according to claim 8, wherein the sealing device is fixed to an end portion of the flange.

12. The fuselage according to claim 1, wherein the line is a fuel line formed as a double-walled line having an inner wall and an outer wall which concentrically surrounds the inner wall.

13. An aircraft or spacecraft having a fuselage comprising an arrangement for passing a line in a load-free manner through a pressure frame of the fuselage, the fuselage comprising:
    an opening penetrating the pressure frame, through which opening the line is passed, wherein the line is mechanically decoupled from the pressure frame;
    a flexible sealing device arranged outside the opening at least in portions, which sealing device is simultaneously operatively connected to the line and the pressure frame for the pressure-tight separation of a first side from a second side of the pressure frame;
    a first end-face coupling device assigned to the first, pressurized side of the pressure frame; and
    a second coupling device assigned to the second, unpressurized side of the pressure frame,
    wherein the line is operatively connected to a line system of the aircraft or spacecraft in a detachable manner by the first end-face coupling device and the second coupling device,
    wherein the first end-face coupling device is fixed to the sealing device and to a first structural element of the fuselage, wherein the first structural element is assigned to the first side of the pressure frame, and
    wherein the second coupling device is fixed to a second structural element of the fuselage assigned to the second side of the pressure frame such that the first end-face coupling device and the second coupling device are on opposite sides of the pressure frame.

14. The fuselage according to claim 1, wherein the first structural element is a crossbar of the fuselage and wherein the second structural element is an A-bracket of the fuselage.

* * * * *